(12) United States Patent
Yamaguchi et al.

(10) Patent No.: US 10,311,576 B2
(45) Date of Patent: Jun. 4, 2019

(54) IMAGE PROCESSING DEVICE AND IMAGE PROCESSING METHOD

(71) Applicant: FUJITSU LIMITED, Kawasaki-shi, Kanagawa (JP)

(72) Inventors: Nobuyasu Yamaguchi, Kawasaki (JP); Yojiro Numata, Kita (JP); Hiroshi Kuwabara, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 15/681,095

(22) Filed: Aug. 18, 2017

(65) Prior Publication Data

US 2018/0089836 A1 Mar. 29, 2018

(30) Foreign Application Priority Data

Sep. 26, 2016 (JP) ................................. 2016-187515

(51) Int. Cl.
| | |
|---|---|
| *G06T 7/13* | (2017.01) |
| *G06T 7/181* | (2017.01) |
| *G06T 7/564* | (2017.01) |
| *G06T 7/33* | (2017.01) |
| *G06T 7/73* | (2017.01) |

(Continued)

(52) U.S. Cl.
CPC .............. *G06T 7/13* (2017.01); *G06T 7/181* (2017.01); *G06T 7/251* (2017.01); *G06T 7/344* (2017.01); *G06T 7/564* (2017.01); *G06T 7/75* (2017.01); *G06K 9/00671* (2013.01); *G06K 9/32* (2013.01); *G06K 9/6211* (2013.01); *G06T 15/02* (2013.01); *G06T 2200/24* (2013.01); *G06T 2207/20104* (2013.01); *G06T 2207/20116* (2013.01); *G06T 2207/30244* (2013.01)

(58) Field of Classification Search
CPC .. G06T 7/13; G06T 7/251; G06T 7/75; G06T 7/344; G06T 7/564; G06T 7/181; G06T 15/02; G06T 2207/20104; G06T 2207/30244; G06T 2200/24; G06T 2207/20116; G06K 9/00671; G06K 9/6211; G06K 9/32
See application file for complete search history.

(56) References Cited

U.S. PATENT DOCUMENTS

2009/0022365 A1 1/2009 Kotake

FOREIGN PATENT DOCUMENTS

JP 2015-118641 6/2015

OTHER PUBLICATIONS

Bruce G. Baumgart, "A polyhedron representation for computer vision", Proceedings of the National Computer Conference and Exposition, May 19-22, 1975, pp. 589-596 (8 pages).

(Continued)

*Primary Examiner* — Qian Yang
(74) *Attorney, Agent, or Firm* — Fujitsu Patent Center

(57) ABSTRACT

A computer extracts a plurality of candidate lines that are observed from a position of an imaging device that captures an image of an object from among a plurality of candidate lines included in shape information of the object. The computer generates plural pieces of association information indicating a prescribed number of combinations obtained by respectively associating the prescribed number of candidate lines of the observed plurality of candidate lines with the prescribed number of feature lines of a plurality of feature lines detected from the image. The computer determines an association result according to respective errors of the plural pieces of association information.

14 Claims, 22 Drawing Sheets

(51) Int. Cl.
*G06T 7/246* (2017.01)
*G06K 9/00* (2006.01)
*G06K 9/32* (2006.01)
*G06K 9/62* (2006.01)
*G06T 15/02* (2011.01)

(56) References Cited

OTHER PUBLICATIONS

Tom Drummond et al., "Real-Time Visual Tracking of Complex Structures", IEEE Transactions on Pattern Analysis and Machine Intelligence. Pattern Analysis and Machine Intelligence, vol. 24, No. 7, Jul. 2002, pp. 932-946 (15 pages).
Lawrence Gilman Roberts, "Machine Perception of Three-Dimensional Solids", MIT Lincoln Lab. Rep., TR3315, May 1963, pp. 1-82 (82 pages).
Extended European Search Report dated Dec. 13, 2017 for corresponding European Patent Application No. 17187032.2, 10 pages.
Lee, Sung Chun et al., "Automatic Pose Estimation of Complex 3D Building Models", Applications of Computer Vision, 2002 (WACV '02), Proceedings of Sixth IEEE Workshop on Dec. 3-4, 2002, Dec. 3, 2002, pp. 148-152, XP010628740.
Persad, Ravi Ancil et al., "Automatic Co-Registration of Pan-Tilt-Zoom (PTZ) Video Images with 3D Wireframe Models", Photogrammetric Engineering and Remote Sensing, vol. 81, No. 11, Nov. 2015, pp. 847-859, XP055431392.
Sandler, Mark B. et al., "A Complete Computer Vision System for Polyhedron Recognition", I-SBAI-UNESP, Sep. 8, 1993, pp. 209-222, XP055431149.

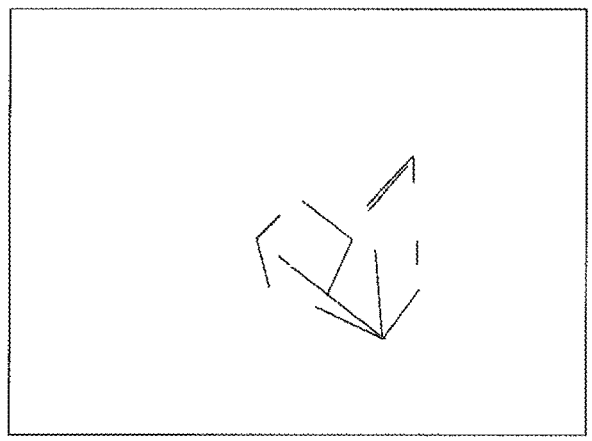
F I G. 5A
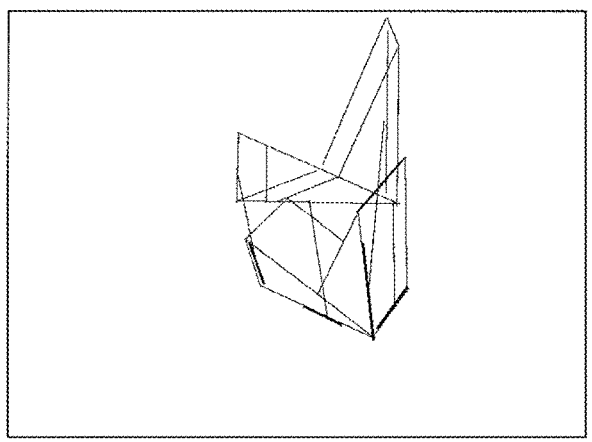
F I G. 5B
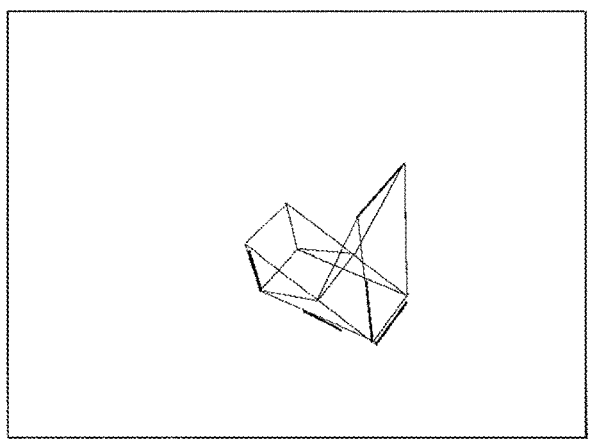
F I G. 5C

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2016-187515, filed on Sep. 26, 2016, the entire contents of which are incorporated herein by reference.

FIELD

The embodiments discussed herein are related to an image processing device and an image processing method.

BACKGROUND

In recent years, a system that displays an image by using an augmented reality (AR) technology has become popular (see, for example, Patent Document 1). As an example of the AR technology, an object is photographed by using a camera mounted on a personal computer (PC), a portable terminal device, or the like, and the position and posture of the camera in a three-dimensional space are estimated from an image of the object. Content information is superimposed and displayed in an arbitrary position within the image by using the determined position and posture of the camera as a reference.

FIG. 1 illustrates an example of a method for obtaining the position and posture of a camera by using feature points included in a captured image. In this method, a three-dimensional map 201 indicating a set of three-dimensional coordinates of map points 211 on an object is generated in advance.

When an image 202 is captured, the map points 211 are projected onto the image 202 by using a transformation matrix M for transforming a three-dimensional coordinate system 203 into a camera coordinate system 204 such that projection points 212 are obtained. The position and posture of the camera in the three-dimensional coordinate system 203 are estimated by associating the projection points 212 with feature points 213 detected from the image 202. As an example, the position of the camera is indicated by a relative position of the camera coordinate system 204 with respect to the three-dimensional coordinate system 203, and the posture of the camera is indicated by a relative angle of the camera coordinate system 204 with respect to the three-dimensional coordinate system 203.

Three-dimensional coordinate Sp of a map point p, two-dimensional coordinate xp' of a projection point that corresponds to the map point p, and two-dimensional coordinate xp of a feature point that corresponds to the map point p are respectively expressed according to the expressions below.

$$Sp=(x,y,z) \quad (1)$$

$$xp'=(u',v') \quad (2)$$

$$xp=(u,v) \quad (3)$$

In this case, the sum of squares E of a distance between the projection point and the feature point on the image is expressed by the expression below.

$$E = \sum_{p} |xp' - xp|^2 \quad (4)$$

The position and posture of the camera are determined by obtaining a transformation matrix M that minimizes the sum of squares E in expression (4).

FIG. 2 illustrates an example of a method for generating the three-dimensional map 201. In this generation method, stereoscopic photographing and stereoscopic measurement are used. An image 301 and an image 302 that are respectively captured from a photographing position 311 and a photographing position 312 are used as key frames, and a feature point 313 in the image 301 and a feature point 314 in the image 302 are associated with each other such that a map point 315 in a three-dimensional space is restored. A plurality of map points are restored by associating a plurality of feature points in an image with a plurality of feature points in another image, and a three-dimensional map 201 indicating a set of the plurality of map points is generated.

Technologies, such as a polyhedron representation for computer vision, visual tracking of structures, and machine perception of three-dimensional solids, are also known (see, for example, Non-Patent Document 1 to Non-Patent Document 3).

Patent Document 1: Japanese Laid-open Patent Publication No. 2015-118641

Non-Patent Document 1: Bruce G. Baumgart, "A polyhedron representation for computer vision", *Proceedings of the May* 19-22, 1975, *national computer conference and exposition*, pp. 589-596, 1975

Non-Patent Document 2: Tom Drummond and Roberto Cipolla, "Real-Time Visual Tracking of Complex Structures", *IEEE Trans. Pattern Analysis and Machine Intelligence*, pp. 932-946, 2002

Non-Patent Document 3: L. G. Robert, "Machine perception of three-dimensional solids", *MIT Lincoln Lab. Rep.*, TR3315, pp. 1-82, May 1963

SUMMARY

According to an aspect of the embodiments, a non-transitory computer-readable recording medium stores an image processing program causing a computer to execute the following process.

(1) The computer extracts a plurality of candidate lines that are observed from a position of an imaging device that captures an image of an object from among a plurality of candidate lines included in shape information of the object.

(2) The computer generates plural pieces of association information indicating a prescribed number of combinations obtained by respectively associating the prescribed number of candidate lines of the observed plurality of candidate lines with the prescribed number of feature lines of a plurality of feature lines detected from the image.

(3) The computer determines an association result according to respective errors of the plural pieces of association information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A illustrates edge lines;
FIG. 5B illustrates association of edge lines and contour lines;
FIG. 5C illustrates superimposition display.

DESCRIPTION OF EMBODIMENTS

Embodiments are described below in detail with reference to the drawings.

Figure 1:
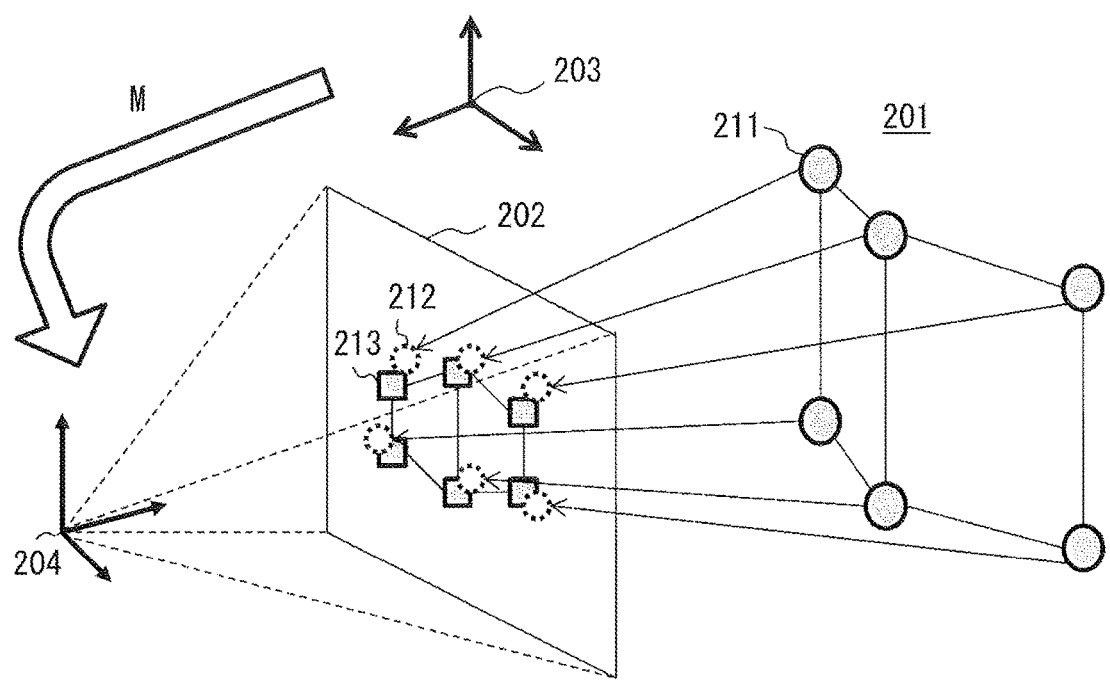
FIG. 1 illustrates a method for obtaining the position and posture of a camera.

In a case in which computer-aided design (CAD) data of an object is used as the three-dimensional map 201 of FIG. 1 when obtaining the position and posture of a camera, a feature of "appearance" such as a pattern or a tint is often different between the CAD data and the object. When it is assumed that this feature of "appearance" is coincident, it is difficult to automatically associate a feature point in an image with a map point indicated by the CAD data by performing image processing. Therefore, the feature point and the map point may be manually associated by operating a mouse on a screen of a PC. In this case, it is conceivable that the problems below are generated.

(A) It is difficult to accurately detect a feature point from an image.

(B) It is difficult to perform an operation to select a projection point obtained by projecting a map point onto an image and the feature point, by using a mouse or the like.

(C) It is difficult to perform an operation to select the projection point and the feature point, and the number of combinations (corresponding pairs) of the projection point and the feature point that are selected is limited due to time and effort of a manual operation.

(D) The number of corresponding pairs is small, and therefore the accuracy of the calculation of the position and posture of a camera is reduced.

Accordingly, a method for associating edge lines detected from an image with contour lines indicated by CAD data, as described in Patent Document 1 or the prior Japanese Patent Application No. 2015-218318, is also conceivable.

Figure 3:
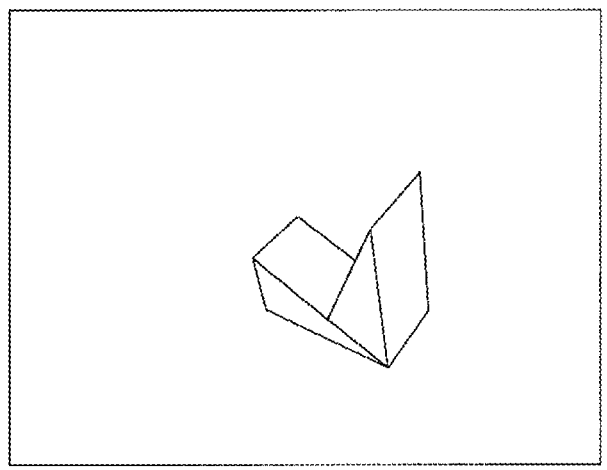
FIG. 3 illustrates an image of an object.
Figure 4:
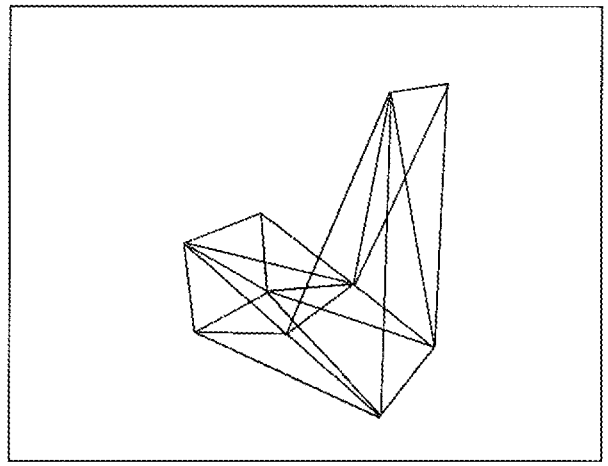
FIG. 4 illustrates CAD data.

FIG. 3 illustrates an example of an image of an object, and FIG. 4 illustrates an example of CAD data that indicates the shape of the object of FIG. 3. FIG. 5A to FIG. 5C illustrate an example of the association of edge lines detected from the image of FIG. 3 with contour lines indicated by the CAD data of FIG. 4.

First, an image processing device such as a portable terminal device performs edge detection processing so as to detect edge lines from an image, as illustrated in FIG. 5A. Then, as illustrated in FIG. 5B, the image processing device displays contour lines indicated by CAD data and the detected edge lines in the image, and a user selects an edge line and a contour line by using a mouse or the like so as to associate these lines with each other. In order to obtain the position and posture of a camera, it is preferable that at least four corresponding pairs be used.

The image processing device calculates the position and posture of the camera by using combinations of the edge line and the contour line that have been associated. As illustrated in FIG. 5C, the image processing device superimposes and displays the contour lines indicated by the CAD data onto the image of the object according to the calculated position and posture of the camera.

By employing the association method above, edge lines can be detected accurately, and an edge line and a contour line can be easily selected, and therefore problems (A) and (B) described above can be solved, but it is conceivable that the problems below are generated.

(E) The number of combinations (corresponding pairs) of a contour line and an edge line that are selected is limited due to time and effort of a manual operation.

(F) The number of corresponding pairs is small, and therefore the accuracy of the calculation of the position and posture of a camera is reduced.

Accordingly, a method for automatically adding a corresponding pair and recalculating the position and posture of a camera, as described in Japanese Patent Application No. 2016-66086, which is another prior application, is also conceivable. The calculation accuracy is improved by increasing the number of corresponding pairs. However, also in this method, a prescribed number of initial corresponding pairs are selected by a user, and a specific method for automatically selecting initial corresponding pairs is not described.

When a user who is not an expert manually selects corresponding pairs by visual observation, it takes time to perform an operation and an erroneous selection may be performed.

A method for performing brute-force calculation by using all of the combinations of an edge line detected from an image and a contour line indicated by CAD data is also conceivable. As an example, when four edge lines are selected from m edge lines and four contour lines are selected from n contour lines such that four corresponding pairs are generated, the total number of combinations is $_mC_4 \times _nC_4$. Therefore, when the number of edge lines and the number of contour lines increase, the total number of combinations becomes enormous, and a calculation amount for generating corresponding pairs increases.

The problems above are not generated only in a case in which an image of an object is associated with CAD data, but are also generated in a case in which the image of the object is associated with other shape information.

Figure 6:
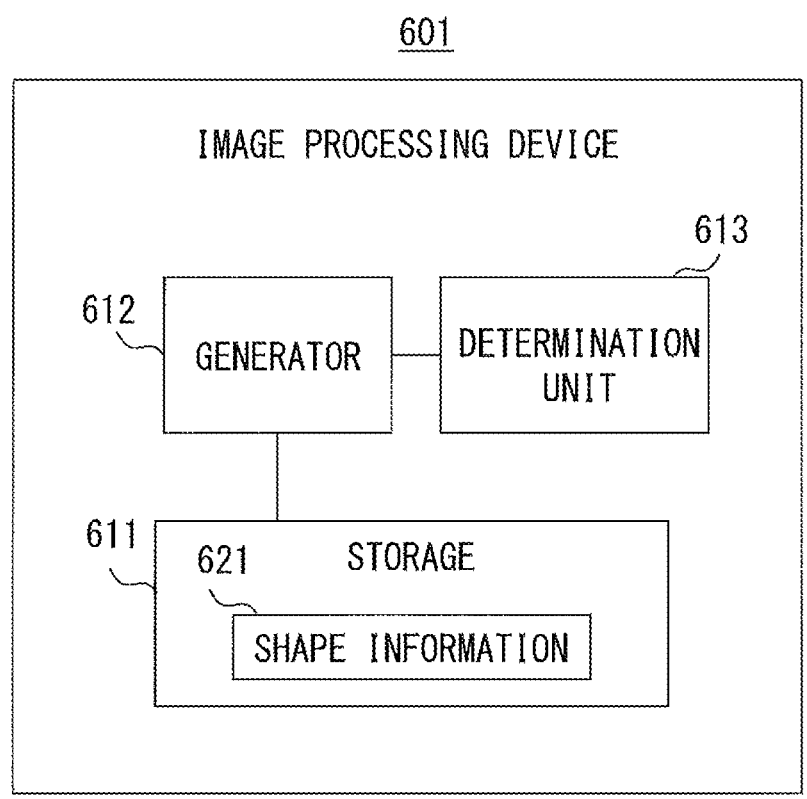
FIG. 6 is a functional block diagram of an image processing device.

FIG. 6 is an example of a functional configuration of an image processing device according to the embodiments. An image processing device 601 illustrated in FIG. 6 includes a storage 611, a generator 612, and a determination unit 613. The storage 611 stores shape information 621 of an object.

Figure 7:
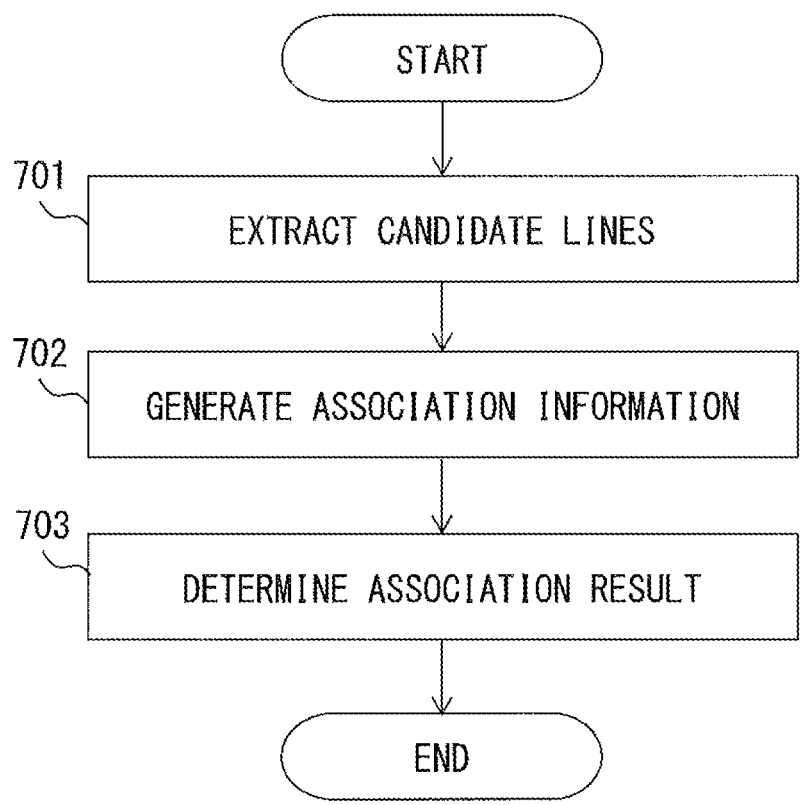
FIG. 7 is a flowchart of image processing.

FIG. 7 is a flowchart illustrating an example of image processing performed by the image processing device 601 of FIG. 6. First, the generator 612 extracts a plurality of candidate lines that are observed from the position of an imaging device that captures an image of an object from among a plurality of candidate lines included in the shape information 621 of the object (step 701). The generator 612 generates plural pieces of association information indicating a prescribed number of combinations obtained by respectively associating the prescribed number of candidate lines of the observed plurality of candidate lines with the prescribed number of feature lines of a plurality of feature lines detected from the image (step 702). The determination unit 613 determines an association result on the basis of respective errors of the plural pieces of association information (step 703).

By employing the image processing device 601 described above, a calculation amount for associating an image of an object with shape information indicating the shape of the object can be reduced.

Figure 8:
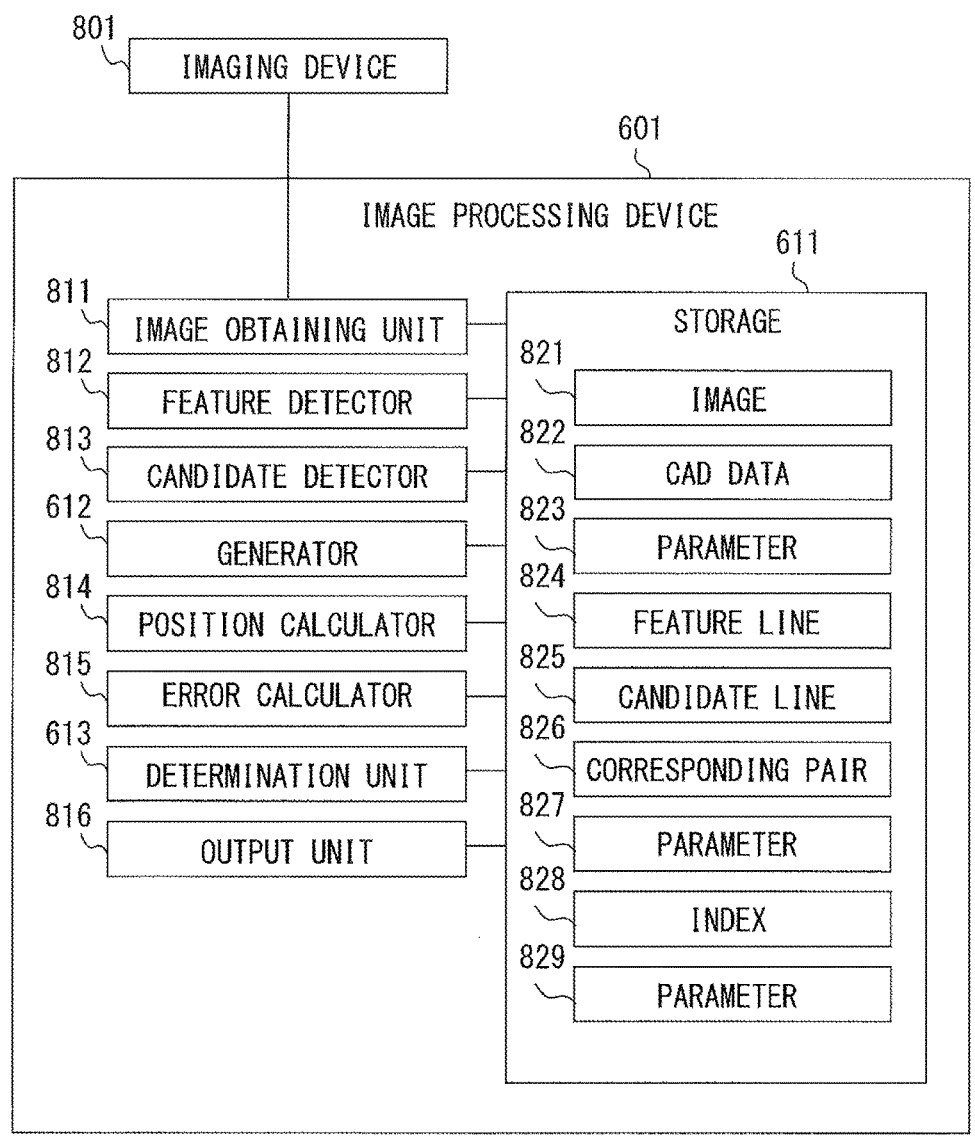
FIG. 8 is a functional block diagram illustrating a specific example of an image processing device.

FIG. 8 illustrates a specific example of the image processing device 601 of FIG. 6. The image processing device 601 of FIG. 8 includes a storage 611, a generator 612, a determination unit 613, an image obtaining unit 811, a feature detector 812, a candidate detector 813, a position calculator 814, an error calculator 815, and an output unit 816.

The image processing device 601 may be a portable terminal device such as a tablet, a laptop PC, or a smart device, or may be an information processing device such as a desktop PC.

An imaging device 801 is, for example, a camera, and the imaging device 801 captures an image 821 of an object. The image obtaining unit 811 obtains the image 821 from the imaging device 801, and stores the image 821 in the storage 611. The storage 611 stores the image 821, CAD data 822, and a parameter 823.

The CAD data 822 corresponds to the shape information 621 of FIG. 6, and the CAD data 822 includes vertex information of a plurality of vertices indicating a three-dimensional shape of an object, and line segment information of a plurality of line segments. The vertex information includes three-dimensional coordinates of each of the vertices of the object, and the line information includes identification information indicating vertices at both ends of each of the line segments.

The parameter 823 indicates the position and posture of the imaging device 801 that are specified in advance in a three-dimensional space. The position and posture indicated by the parameter 823 are a provisional position and posture, and do not always match a position and a posture of the imaging device 801 at the time when the image 821 was captured.

The feature detector 812 performs edge detection processing so as to detect a plurality of edge lines from the image 821, and stores the detected edge lines as feature lines 824 in the storage 611. The candidate detector 813 detects a plurality of line segments included in the CAD data 822, and stores the detected line segments as a plurality of candidate lines 825 in the storage 611.

The generator 612 extracts a plurality of feature lines that satisfy a prescribed condition from among the feature lines 824 detected from the image 821. Examples of the prescribed condition include that at least a portion of a feature line is included in a specified region within the image 821, and that a feature line exists within a range of a prescribed distance from a reference position within the image 821. In addition, the generator 612 extracts a plurality of candidate lines observed from the position and posture indicated by the parameter 823 from among the candidate lines 825 detected from the CAD data 822.

The generator 612 generates N combinations obtained by respectively associating N candidate lines (N is an integer that is greater than or equal to 2) of the extracted candidate lines with N feature lines of the extracted feature lines. The generator 612 stores the generated N combinations as N corresponding pairs 826 in the storage 611. The corresponding pair 826 corresponds to the association information.

The position calculator 814 calculates a position and a posture of the imaging device 801 at the time when the image 821 was captured, by using the N corresponding pairs 826, and stores the calculated position and posture as a parameter 827 in the storage 611.

At this time, the position calculator 814 generates a projection line by projecting a candidate line included in each of the corresponding pairs onto the image 821 while sequentially changing variables indicating the position and posture of the imaging device 801 by a prescribed value. The error calculator 815 calculates an error indicating a deviation between the position of the projection line generated by the position calculator 814 and the position of the feature line included in each of the corresponding pairs. The position calculator 814 obtains values of variables that minimize the total of errors calculated by the error calculator 815 as the parameter 827.

The position calculator 814 repeats a process for calculating the parameter 827 plural times while changing the selection of N corresponding pairs. The determination unit 613 generates N projection lines by projecting candidate lines included in the N corresponding pairs selected by the position calculator 814 onto the image 821 by using the position and posture of the imaging device 801 indicated by the parameter 827, every time the parameter 827 is calculated. The determination unit 613 calculates the total of errors between the positions of the N projection lines and the positions of the N feature lines, similarly to the error calculator 815, and stores the calculated total of errors as an index 828 in the storage 611.

The determination unit 613 determines N corresponding pairs that minimize the total of errors on the basis of the index 828 calculated by using the respective parameters 827. These N corresponding pairs correspond to an association result. The determination unit 613 calculates the position and posture of the imaging device 801 in a three-dimensional space by using the determined N corresponding pairs, and stores the calculated position and posture as a parameter 829 in the storage 611. The output unit 816 outputs the parameter 829 as a processing result.

By employing the image processing device 601 described above, corresponding pairs of a candidate line detected from the CAD data 822 and a feature line detected from the image 821 can be automatically generated without a user performing a selection operation. At this time, candidate lines and feature lines used to generate the corresponding pairs are narrowed by the generator 612, and therefore a calculation amount to determine N corresponding pairs is greatly reduced in comparison with a case in which brute-force calculation is performed.

Figure 9:
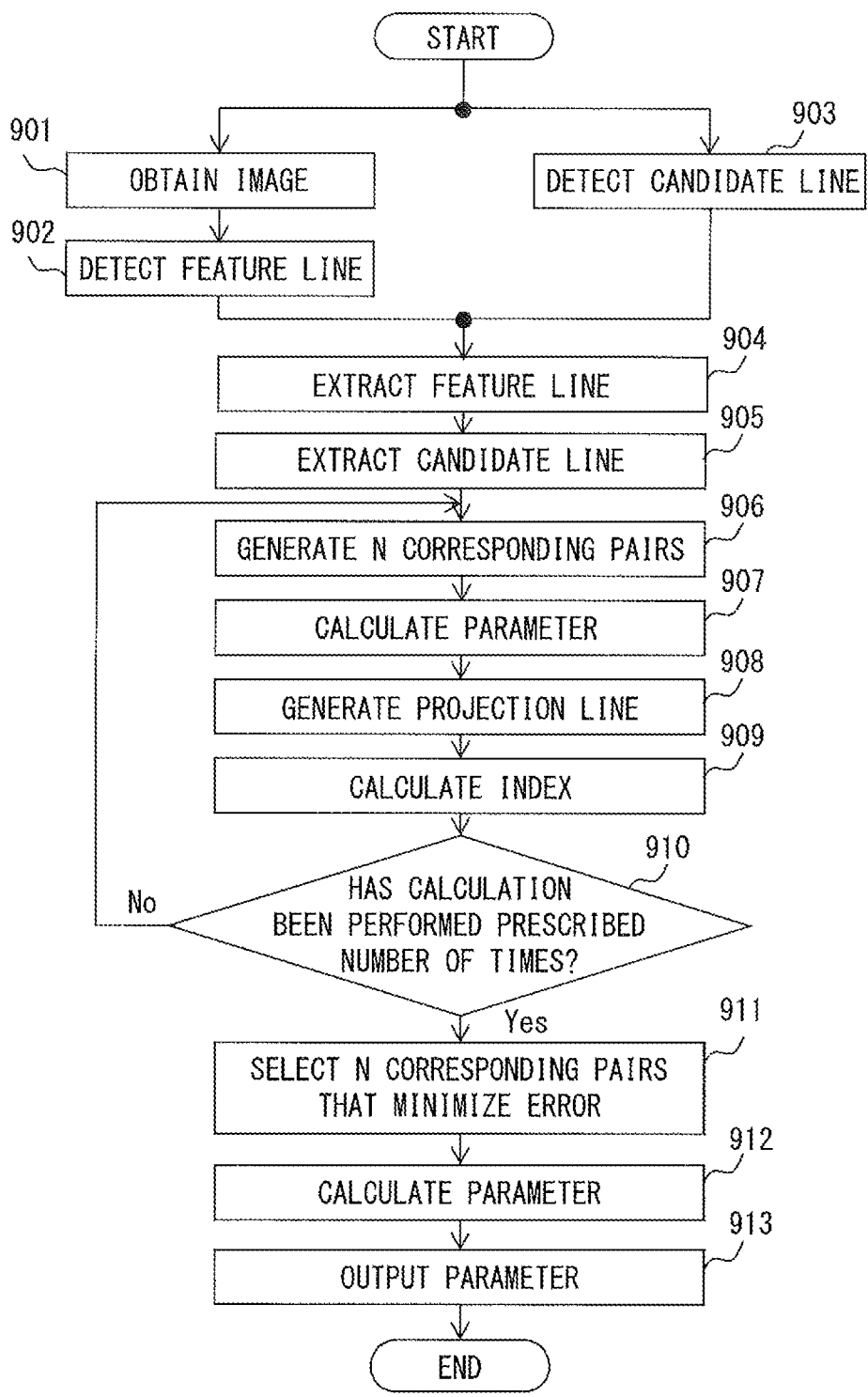
FIG. 9 is a flowchart illustrating a specific example of image processing.

FIG. 9 is a flowchart illustrating a specific example of image processing performed by the image processing device 601 of FIG. 8. First, the image obtaining unit 811 obtains the image 821 from the imaging device 801 (step 901), and the feature detector 812 detects a plurality of feature lines 824 from the image 821 (step 902). In addition, the candidate detector 813 detects a plurality of candidate lines 825 from the CAD data 822 (step 903).

The generator 612 extracts a plurality of feature lines that satisfy a prescribed condition from among the plurality of feature lines 824 (step 904). As the prescribed condition, the conditions below are used, for example.

(C1) At least a portion of a feature line is included in a specified region within the image 821.

(C2) A feature line exists within a range of a prescribed distance from a reference position within the image 821.

When condition (C1) is used, a user can narrow feature lines used to generate corresponding pairs by a user only performing a simple operation to specify a region in which an object is photographed.

When condition (C2) is used, feature lines used to generate corresponding pairs can be narrowed on the basis of a reference position of a reference point, a reference line, or the like that is set in advance without a user specifying a region. When a user photographs an object, the object often appears near the center position of the image 821, and therefore it is effective to use the center position of the image 821 as a reference position.

Figure 10:
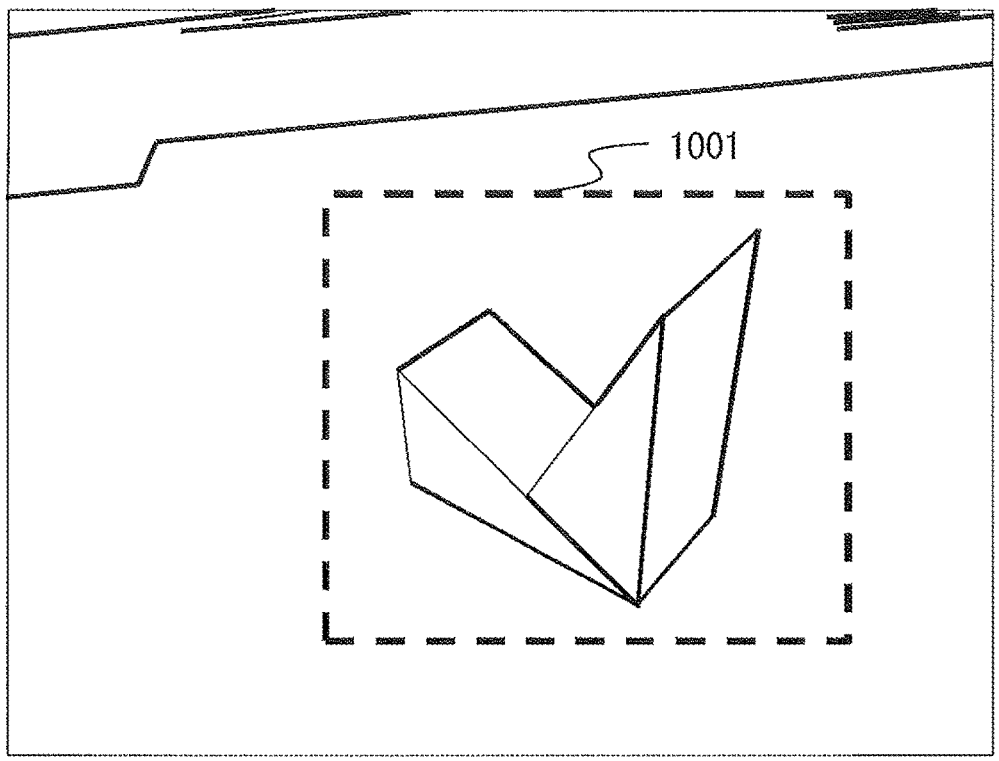
FIG. 10 illustrates a specified rectangular region.

FIG. 10 illustrates an example of a specified rectangular region in the image 821. When a rectangular region 1001 is specified within the image 821 by a user, the generator 612 extracts a feature line for which a portion or the entirety is included in the rectangular region 1001. In this case, nine feature lines are extracted from eighteen feature lines detected from the image 821.

Figure 11:
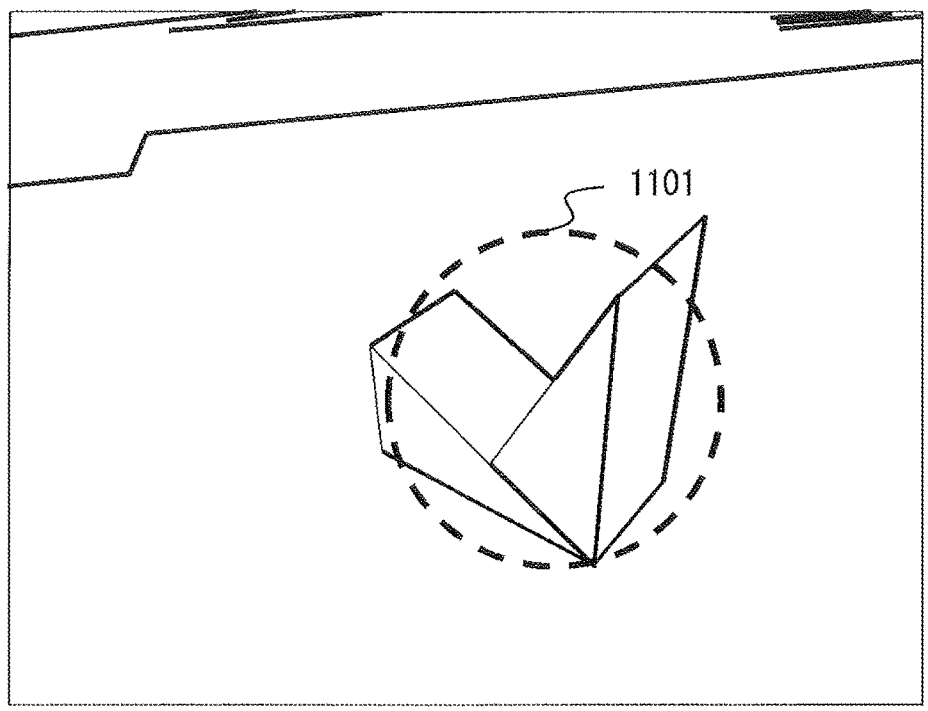
FIG. 11 illustrates a specified circular region.

FIG. 11 illustrates an example of a specified circular region within the image 821. When a circular region 1101 is specified in the image 821 by a user, the generator 612 extracts a feature line for which a portion or the entirety is included in the circular region 1101. Also in this case, nine feature lines are extracted from eighteen feature lines detected from the image 821.

Figure 12:
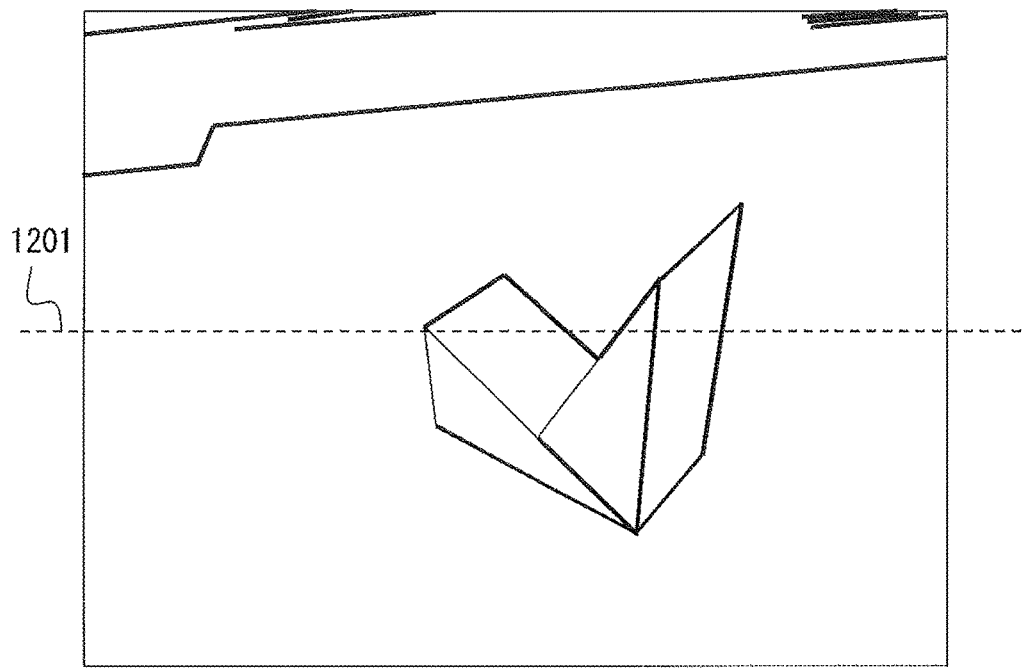
FIG. 12 illustrates a reference line.

FIG. 12 illustrates an example of a reference line within the image 821. The generator 612 extracts a feature line that exists within a range of a prescribed distance from a straight line 1201 that passes through the center position of the image 821. As a distance from the straight line 1201 to the feature line, the length of a perpendicular line that is drawn from one endpoint of the feature line onto the straight line 1201 may be used, or the length of a perpendicular line that is drawn from a middle point of the feature line onto the straight line 1201 may be used.

The generator 612 extracts a plurality of candidate lines observed from a position and a posture that are indicated by the parameter 823 from among a plurality of candidate lines 825 (step 905). As an example, the generator 612 removes hidden lines from the plurality of candidate lines 825 by using the position and posture indicated by the parameter 823 as the position and posture of the imaging device 801, according to the method described in Non-Patent Document 3 such that the remaining candidate lines can be extracted.

The hidden lines are not observed from the imaging device 801, and therefore many feature lines that correspond to the hidden lines are not detected from the image 821. Accordingly, by removing the hidden lines from the candidate lines 825, candidate lines used to generate corresponding pairs can be effectively narrowed.

Figure 13:
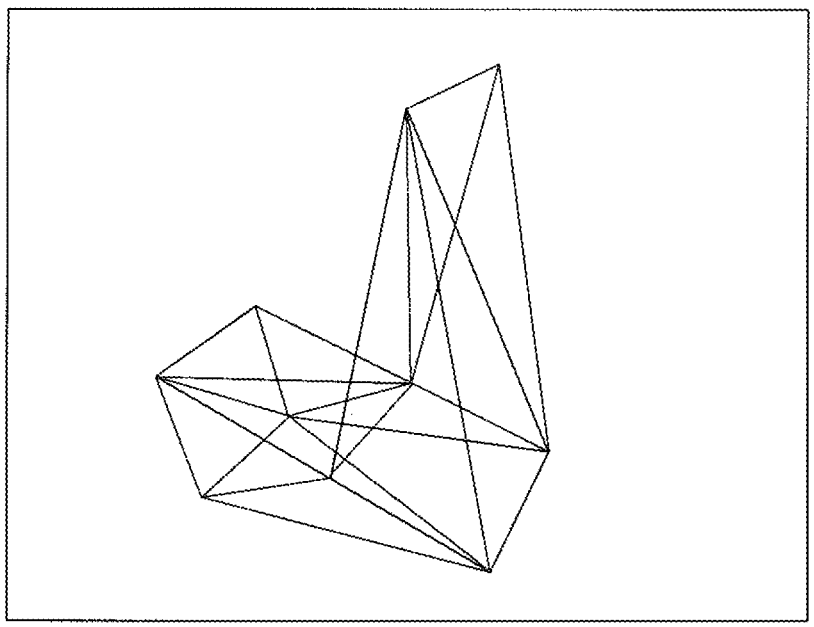
FIG. 13 illustrates candidate lines.

FIG. 13 illustrates an example of the candidate lines 825 detected from the CAD data 822 of an object photographed in the image 821 illustrated in FIG. 10 to FIG. 12. In this example, 25 candidate lines 825 are detected.

Figure 14:
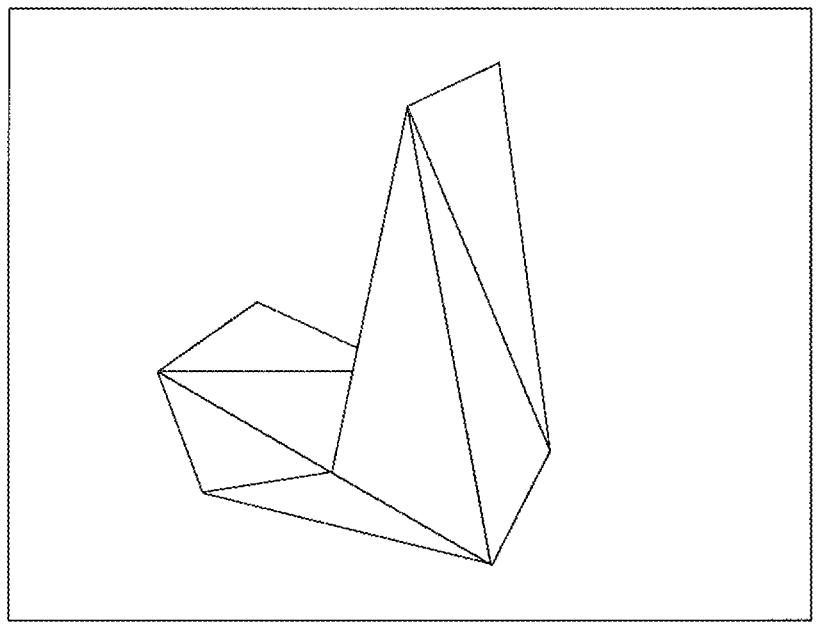
FIG. 14 illustrates remaining candidate lines.

FIG. 14 illustrates an example of the remaining candidate lines after hidden lines are removed from the candidate lines 825 illustrated in FIG. 13. By removing 11 hidden lines from the 25 candidate lines 825, 14 candidate lines are extracted.

The generator 612 may extract candidate lines indicating an outline edge of an object from the remaining candidate lines, and the generator 612 may further extract candidate lines indicating an outer periphery of the object from the candidate lines indicating the outline edge. The candidate lines indicating the outer periphery of the object indicate contour lines of the object, and can be detected by using a boundary representations technology in computer graphics (CG).

As disclosed in Non-Patent Document 1, for example, data having a winged-edge structure, which is an example of boundary representations, includes information indicating a contour line, and vertices and faces that form the contour line, and information indicating a connection relationship with another contour line. Whether respective candidate lines detected from CAD data correspond to an outer periphery can be determined on the basis of these pieces of information.

When the feature line 824 detected from the image 821 is a contour line, a boundary line between the object and a background is detected as the feature line 824. The object and the background are physically separated from each other, and therefore a manner in which light such as the sun or illumination strikes is often different, or a material or color is often different. Therefore, a clearer feature line is likely to be detected, and the accuracy of the position of the feature line increases. In addition, by generating a large number of corresponding pairs indicating contour lines, a distribution range of the corresponding pairs in the image 821 increases, and it can be considered that this results in improvements in the accuracy of the calculation of the parameter 829.

Figure 15:
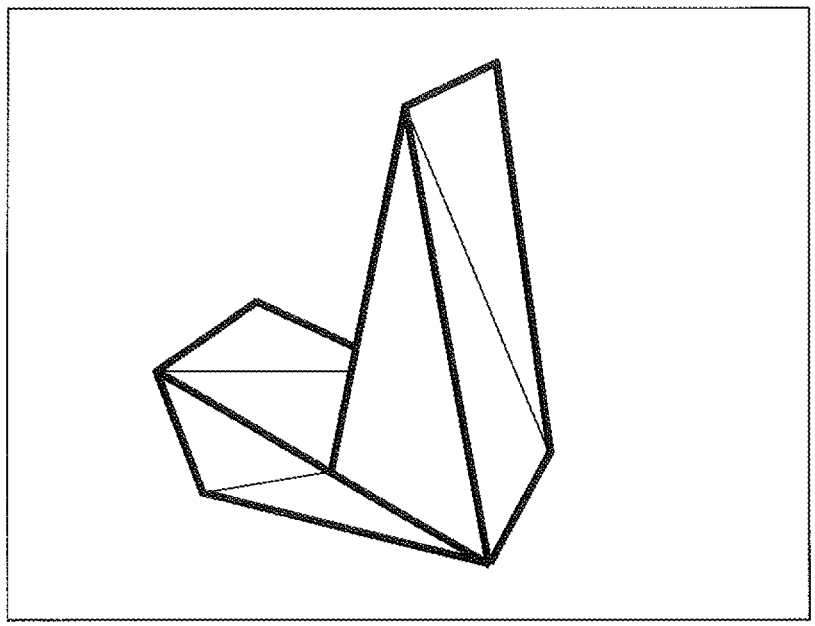
FIG. 15 illustrates candidate lines indicating an outline edge of an object.

FIG. 15 illustrates an example of candidate lines indicating an outline edge of an object. From among the 14 candidate lines illustrated in FIG. 14, 11 candidate lines illustrated with a bold line are extracted as candidate lines indicating an outline edge.

Figure 16:
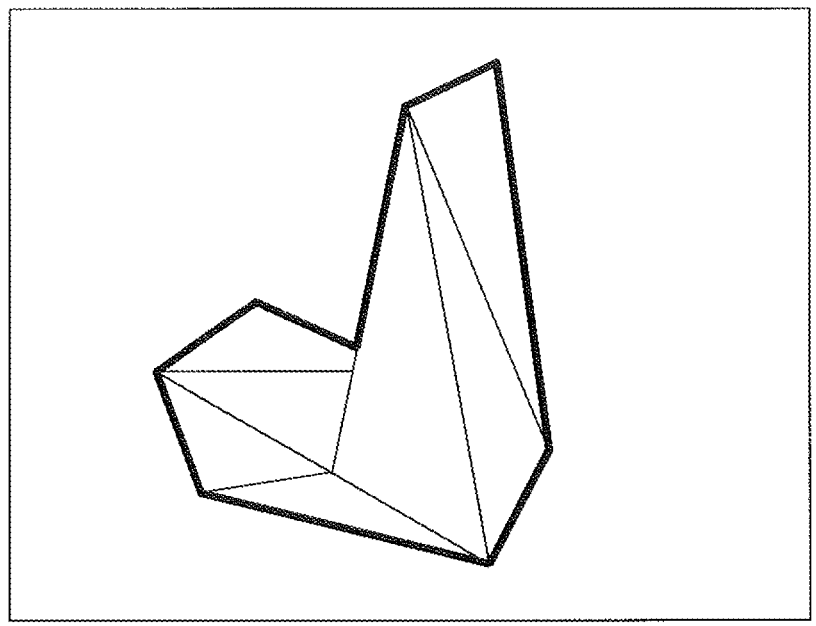
FIG. 16 illustrates candidate lines indicating an outer periphery of an object.

FIG. 16 illustrates an example of candidate lines indicating an outer periphery of an object. From among the 11 candidate lines illustrated in FIG. 15, 8 candidate lines illustrated with a bold line are extracted as candidate lines indicating an outer periphery.

The generator 612 may select and use a candidate line that is longer than a prescribed length when the candidate line is projected onto the image 821, from among the candidate lines illustrated in FIG. 14 to FIG. 16. When a projection line is long, a contour line itself that indicates the shape of an object is long, and therefore the projection line is highly likely to be associated with a longer feature line. In addition, a longer feature line is considered to have a high reliability. Further, in calculating the position and posture of the imaging device 801, as both a projection line and a feature line become longer, the accuracy of the calculation of an error between the projection line and the feature line is improved, and therefore the accuracy of the calculation of the parameter 829 is also improved.

The generator 612 generates N corresponding pairs 826 obtained by associating N candidate lines and N feature lines with each other (step 906), and the position calculator 814 calculates a parameter 827 by using these corresponding pairs 826 (step 907).

Figure 17:
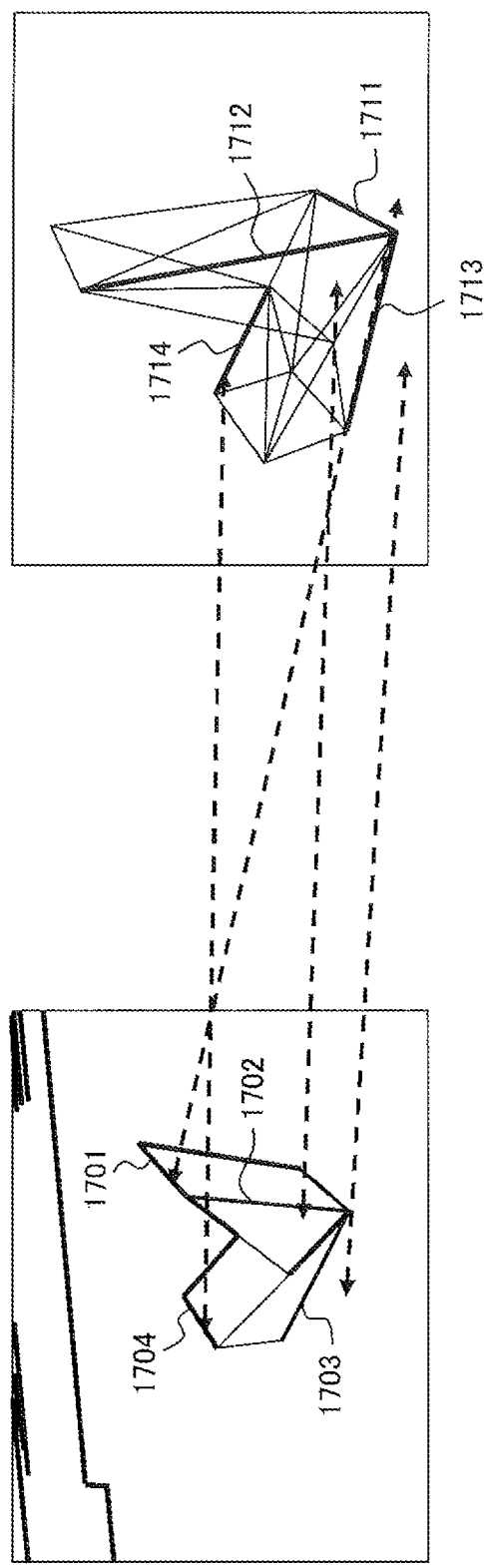
FIG. 17 illustrates corresponding pairs.

FIG. 17 illustrates an example of corresponding pairs. In this example, a candidate line 1711 to a candidate line 1714 are respectively associated with a feature line 1701 to a feature line 1704 such that four corresponding pairs are generated.

In step 907, the position calculator 814 can calculate the parameter 827 by using a least-squares method, for example. In this case, the position calculator 814 generates a projection line by projecting a candidate line included in each of the corresponding pairs onto the image 821 while sequentially changing variables indicating the position and posture of the imaging device 801 by a prescribed value. The error calculator 815 estimates an error Ei (i=1 to N) between the position of the projection line and the position of a feature line included in each of the corresponding pairs, and obtains values of variables that minimize the total E of square errors with respect to the N corresponding pairs as the parameter 827. The total E of square errors is calculated according to the expression below.

$$E = \sum_{i=1}^{N} (Ei)^2 \quad (11)$$

Figure 18:
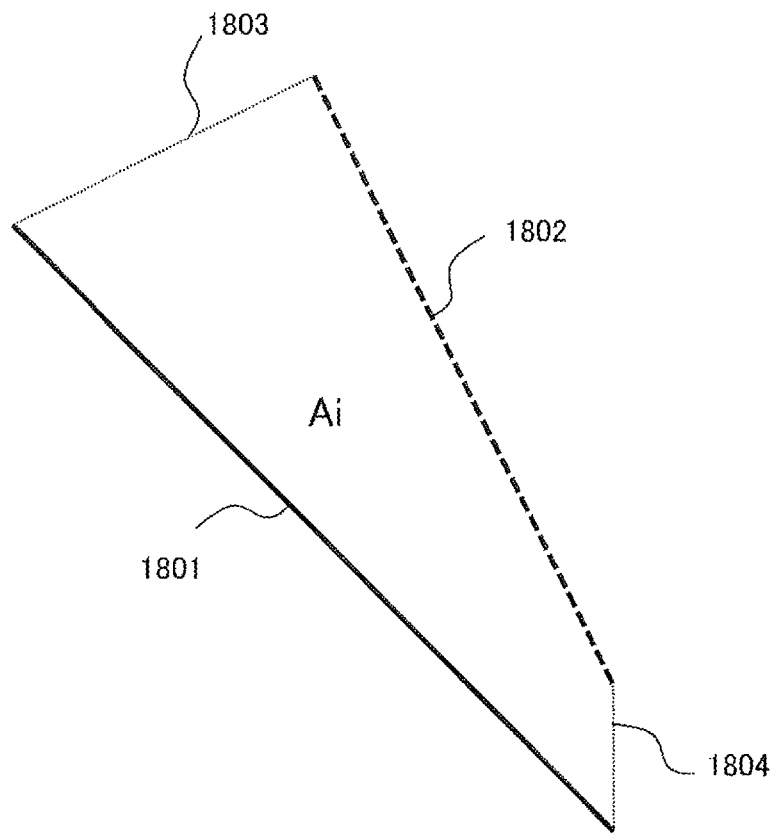
FIG. 18 illustrates a calculation method based on the area of a region.
Figure 19:
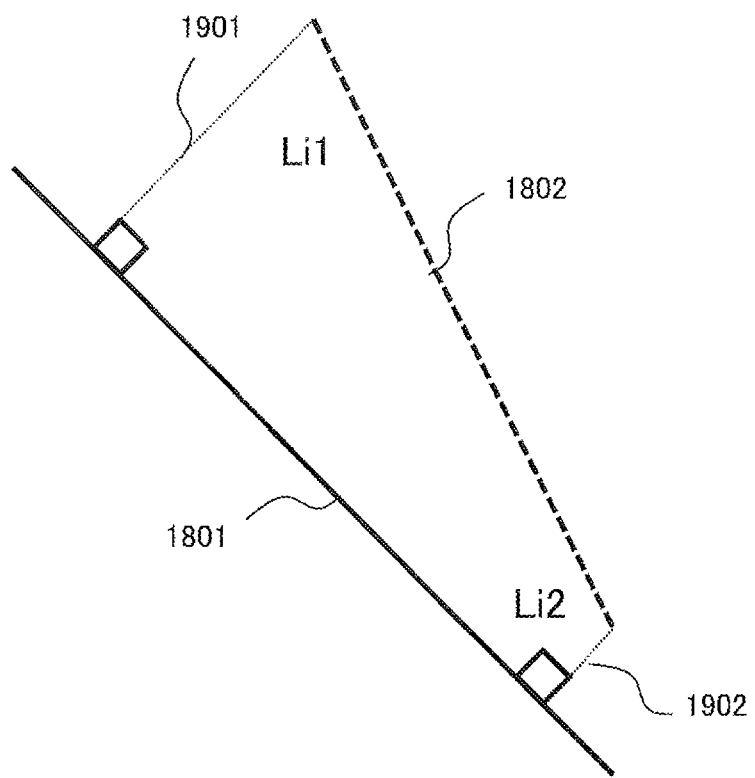
FIG. 19 illustrates a calculation method based on a distance.

The error calculator 815 can calculate the error Ei by using, for example, the method illustrated in FIG. 18 or FIG. 19. FIG. 18 illustrates an example of a calculation method based on the area of a region between a projection line and a feature line. When a projection line included in the i-th corresponding pair is a line segment 1801, and a feature line is a line segment 1802, a line segment 1803 and a line segment 1804 that respectively connect both ends of the line segment 1801 and both ends of the line segment 1802 can be defined. In this case, the area Ai of a region surrounded by the line segment 1801 to the line segment 1804 can be used as the error Ei.

$$Ei = Ai \quad (12)$$

As the area Ai becomes smaller, the error Ei also becomes smaller, and when the line segment 1801 overlaps the line segment 1802, the error Ei is 0.

FIG. 19 illustrates an example of a calculation method based on a distance between a projection line and a feature line. The lengths of a perpendicular line 1901 and a perpendicular line 1902 that are drawn from both ends of a line segment 1802 onto a line segment 1801 are assumed to be Li1 and Li2, respectively. In this case, the sum of Li1 and Li2 can be used as the error Ei.

$$Ei = Li1 + Li2 \quad (13)$$

As Li1 and Li2 become shorter, the error Ei becomes smaller, and when the line segment 1801 overlaps the line segment 1802, the error Ei is 0.

The determination unit 613 generates N projection lines by projecting candidate lines included in the N corresponding pairs onto the image 821 by using the position and posture of the imaging device 801 indicated by the parameter 827 (step 908).

The determination unit 613 calculates the index 828 indicating the total of errors between the positions of the N projection lines and the positions of the N feature lines (step 909), and checks whether the index 828 has been calculated a prescribed number of times (step 910). When the index 828 has not been calculated a prescribed number of times (step 910, No), the position calculator 814 changes the selection of N corresponding pairs (step 906), and the image processing device 601 repeats the processes of step 907 and the subsequent steps.

When the index 828 has been calculated a prescribed number of times (step 910, Yes), the determination unit 613 selects N corresponding pairs that minimize the total of errors (step 911), and calculates the parameter 829 on the basis of the corresponding pairs (step 912). The output unit 816 outputs the selected N corresponding pairs and the parameter 829 (step 913).

In the image processing of FIG. 9, N corresponding pairs that minimize the total of errors can be obtained by repeating the calculation of the index 828 while automatically changing the selection of N corresponding pairs. By doing this, an operation time of a selection operation performed by a user is reduced, and a processing time is also reduced. In addition, the accuracy of the estimation of the position and posture of the imaging device 801 is improved.

In addition, an erroneous selection due to a human error is not performed, and therefore a processing time does not increase due to re-selection. Even a user who is not an expert can obtain N optimum corresponding pairs, and therefore the type of an operation to which an association result is applied and a target for the operation can be increased.

In step 910 of FIG. 9, the image processing device 601 may abort a repeating process when the error indicated by the index 828 becomes smaller than a prescribed value, instead of aborting the repeating process when the index 828 has been calculated a prescribed number of times.

In step 907 and step 909, the image processing device 601 may estimate a degree of similarity between a projection line and a feature line instead of an error between the position of the projection line and the position of the feature line. As the degree of similarity between the projection line and the feature line, a degree of similarity between two line segments described in Patent Document 1 can be used, for example. In this case, a parameter 827 that maximizes the total of degrees of similarity is obtained in step 907, and N corresponding pairs that maximize the total of degrees of similarity is selected in step 911.

Even when the total of errors of the N corresponding pairs selected in step 911 is the smallest, respective projection lines may indicate line segments obtained by rotating respective feature lines by 180 degrees.

Figure 20:
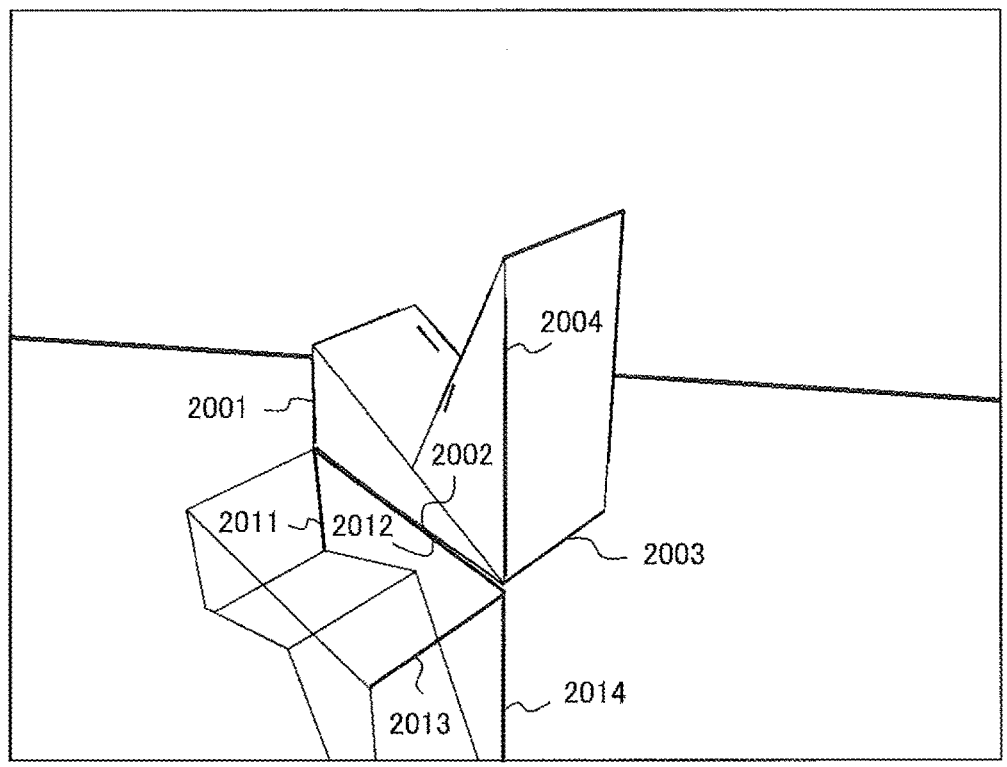
FIG. 20 illustrates line segments rotated by 180 degrees.

FIG. 20 illustrates an example of line segments rotated by 180 degrees. Among the projection lines and the feature lines of FIG. 20, a projection line 2012 overlaps a feature line 2002. A projection line 2011, a projection line 2013, and a projection line 2014 respectively correspond to line segments obtained by rotating the feature line 2002, a feature line 2003, and a feature line 2004 by 180 degrees with the projection line 2012 as an axis. In this case, the area Ai in expression (12) is almost 0, and therefore the total of errors may be the smallest.

In order to prohibit the association above, the determination unit 613 may select N corresponding pairs that minimize the total of errors from among N corresponding pairs that satisfy the conditions below.

(C11) Among N projection lines, a prescribed ratio of projection lines are included in the image 821.

(C12) Among N projection lines, a prescribed ratio of projection lines exist near a prescribed position within the image 821.

(C13) A ratio of a distribution range of N projection lines with respect to the area of the image 821 is greater than or equal to a prescribed value.

Figure 21A:
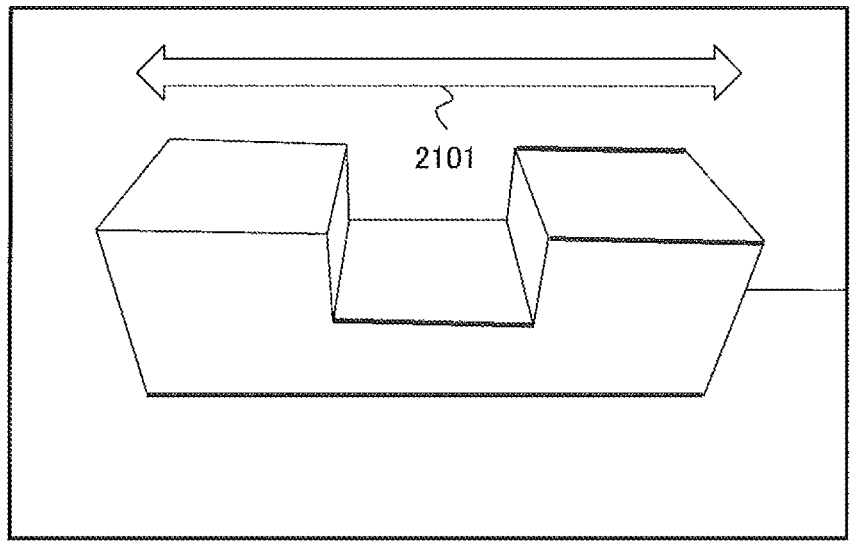
FIG. 21A illustrates four candidate lines parallel to each other.
Figure 21B:
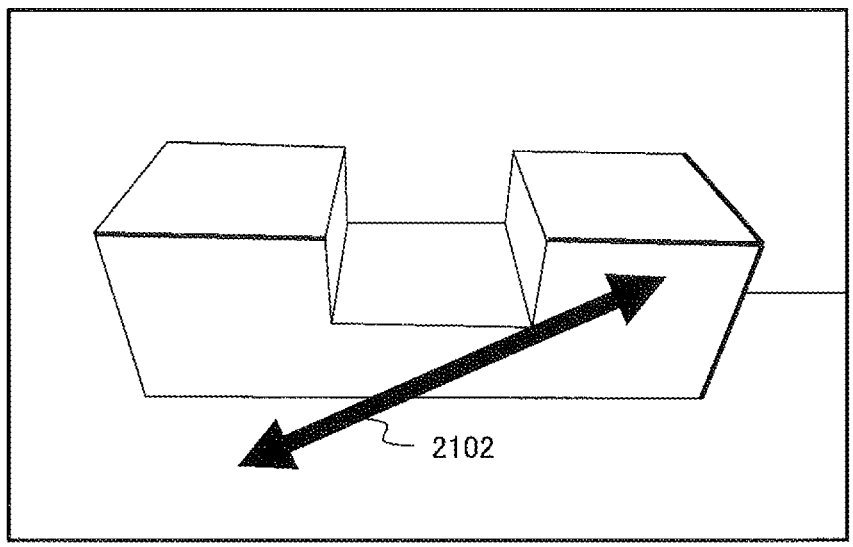
FIG. 21B illustrates two candidate lines that exist on the same straight line.

FIG. 21A and FIG. 21B illustrate examples of candidate lines that are not suitable for the calculation of the parameter 827. FIG. 21A illustrates four candidate lines parallel to each other. In a case in which four candidate lines are parallel to each other, even when the candidate lines are moved in parallel in the direction of an arrow 2101, errors do not change, and it may be difficult to fix the positions of the candidate lines.

FIG. 21B illustrates two candidate lines that exist on the same straight line. In a case in which two candidate lines exist on the same straight line, even when the candidate lines are enlarged or reduced in the direction of an arrow 2102, errors do not change, and it may be difficult to fix a scale.

Accordingly, in step 906 of FIG. 9, the generator 612 may select N candidate lines that satisfy the conditions below, and may generate N corresponding pairs.

(C21) Among N candidate lines, at least two candidate lines are not parallel to each other.

(C22) Among N candidate lines, no two candidate lines exist on the same straight line.

For a similar reason, the generator 612 may select N feature lines that satisfy the conditions below, and may generate N corresponding pairs.

(C31) Among N feature lines, at least two feature lines are not parallel to each other.

(C32) Among N feature lines, no two feature lines exist on the same straight line.

The configurations of the image processing devices 601 illustrated in FIG. 6 and FIG. 8 are examples, and some components may be omitted or changed according to the purpose or condition of the image processing device 601. As an example, when a process for detecting the feature line 824 from the image 821 is performed by a device external to the image processing device 601, the feature detector 812 of FIG. 8 can be omitted.

When a process for extracting the candidate line 825 from the CAD data 822 is performed by an external device, the candidate detector 813 can be omitted. Another shape information indicating the shape of an object may be used instead of the CAD data 822.

The flowcharts of FIG. 7 and FIG. 9 are examples, and some processes may be omitted or changed according to the configuration or condition of the image processing device 601. As an example, when a process for detecting the feature line 824 from the image 821 is performed by a device external to the image processing device 601, the processes of step 901 and step 902 in FIG. 9 can be omitted. When a process for detecting the candidate line 825 from the CAD data 822 is performed by an external device, the process of step 903 in FIG. 9 can be omitted.

When the posture of the imaging device 801 is determined in advance, only the position of the imaging device 801 may be obtained as a parameter in step 907 and step 912 of FIG. 9.

Figure 2:
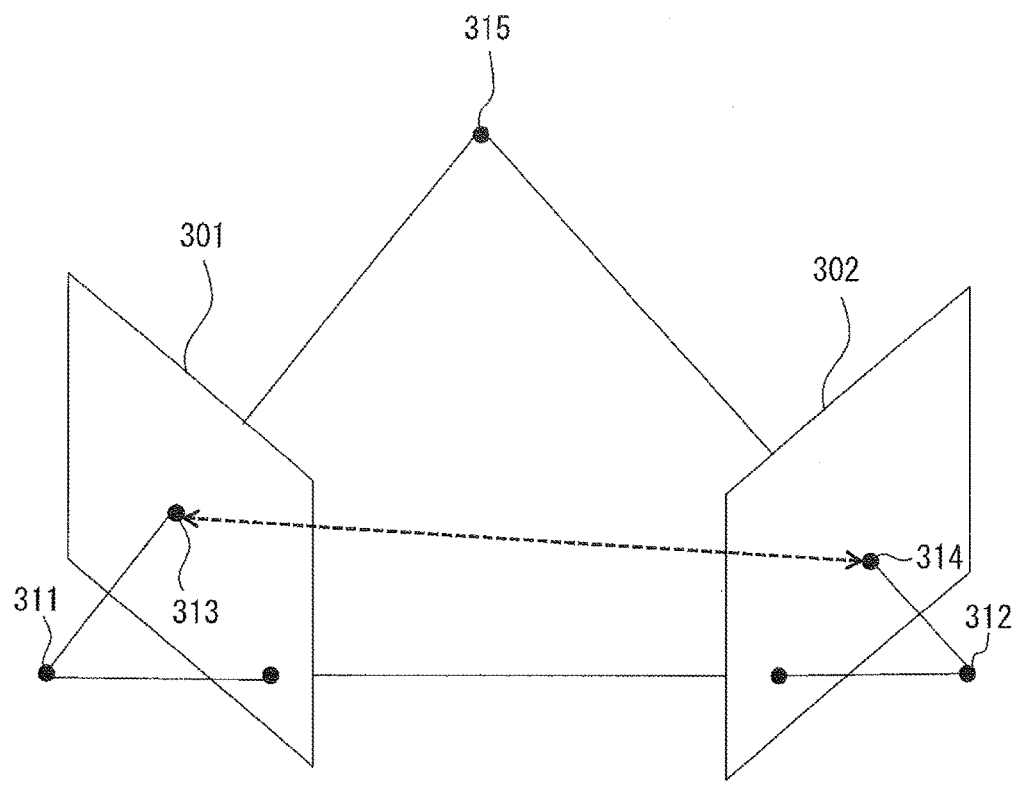
FIG. 2 illustrates a method for generating a three-dimensional map.

The three-dimensional map and the image illustrated in FIG. 1 are examples, and a three-dimensional map and an image change according to an object to be photographed. The method of FIG. 2 for generating a three-dimensional map is an example, and a three-dimensional map may be generated by using another method according to the configuration or condition of the image processing device 601.

The image of FIG. 3, the CAD data of FIG. 4, and the edge lines and the contour lines of FIG. 5A to FIG. 5C are examples, and an image, CAD data, and edge lines and contour lines change according to an object to be photographed, or the configuration or condition of the image processing device 601.

The specified regions of FIG. 10 and FIG. 11, and the reference line of FIG. 12 are examples, and a specified region having another shape and another reference line may be used according to the configuration or condition of the image processing device 601.

The candidate lines of FIG. 13 to FIG. 16, FIG. 21A, and FIG. 21B, the feature lines and the candidate lines of FIG. 17, and the feature lines and the projection lines of FIG. 20 are examples. Candidate lines, feature lines, and projection lines change according to an object to be photographed, or the configuration or condition of the image processing device 601.

The methods of FIG. 18 and FIG. 19 for calculating an error are examples, and another calculation method may be used according to the configuration or condition of the image processing device 601. Calculation expression (1) to calculation expression (13) are examples, and other calculation expressions may be used according to the configuration or condition of the image processing device 601.

Figure 22:
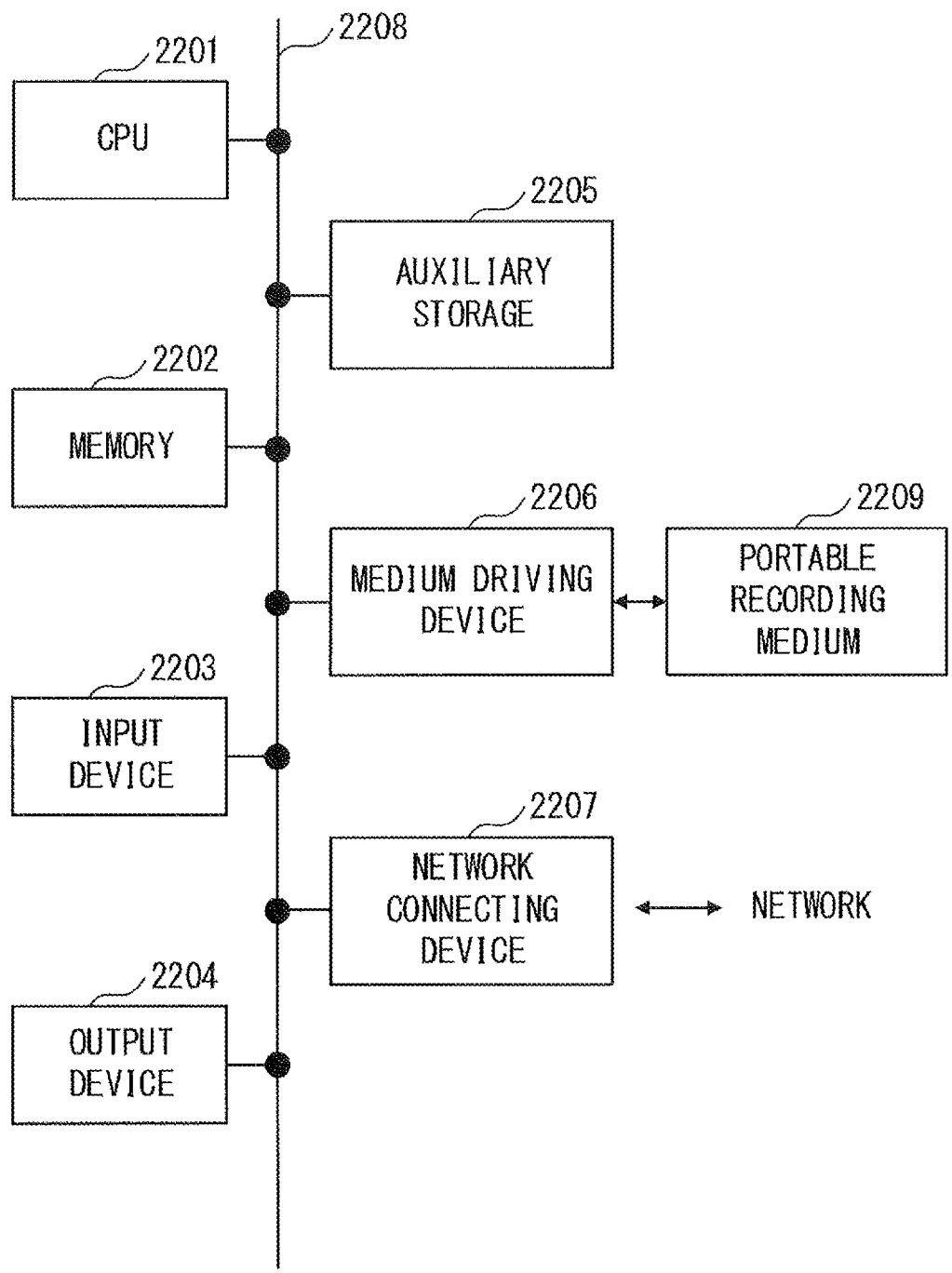
FIG. 22 is a block diagram of an information processing device.

FIG. 22 is an example of the configuration of an information processing device (a computer) used as the image processing device 601 of FIG. 6 or FIG. 8. The information processing device of FIG. 22 includes a central processing unit (CPU) 2201, a memory 2202, an input device 2203, an output device 2204, an auxiliary storage 2205, a medium driving device 2206, and a network connecting device 2207. These components are connected to each other via a bus 2208. The imaging device 801 of FIG. 8 may be connected to the bus 2208.

The memory 2202 is a semiconductor memory such as a read-only memory (ROM), a random access memory (RAM), or a flash memory, and the memory 2202 stores a program and data used in image processing. The memory 2202 can be used as the storage 611 of FIG. 6 or FIG. 8.

The CPU 2201 (a processor) operates as the generator 612 and the determination unit 613 of FIG. 6 or FIG. 8, for example, by executing a program by using the memory 2202. The CPU 2201 also operates as the feature detector 812, the candidate detector 813, the position calculator 814, and the error calculator 815 of FIG. 8.

The input device 2203 is, for example, a keyboard, a pointing device, or the like, and the input device 2203 is used for an instruction from an operator or a user, or an input of information. The output device 2204 is, for example, a display device, a printer, a speaker, or the like, and the output device 2204 is used for an inquiry or an instruction to an operator or a user, and an output of a processing result. The processing result may be N corresponding pairs determined by the determination unit 613. The output device 2204 can be used as the output unit 816 of FIG. 8.

The auxiliary storage 2205 is, for example, a magnetic disk drive, an optical disk drive, a magneto-optical disk drive, a tape device, or the like. The auxiliary storage 2205 may be a hard disk drive. The information processing device can store a program and data in the auxiliary storage 2205, can load them into the memory 2202, and can use them. The auxiliary storage 2205 can be used as the storage 611 of FIG. 6 or FIG. 8.

The medium driving device 2206 drives a portable recording medium 2209, and accesses its recording content. The portable recording medium 2209 is a memory device, a flexible disk, an optical disk, a magneto-optical disk, or the like. The portable recording medium 2209 may be a compact disk read-only memory (CD-ROM), a digital versatile disk (DVD), a universal serial bus (USB) memory, or the like. An operator or a user can store a program and data in the portable recording medium 2209, can load them into the memory 2202, and can use them.

As described above, a computer-readable recording medium that stores a program and data used in image processing is a physical (non-transitory) recording medium such as the memory 2202, the auxiliary storage 2205, or the portable recording medium 2209.

The network connecting device 2207 is a communication interface that is connected to a communication network such as a local area network or a wide area network, and that performs data conversion associated with communication. The information processing device can receive a program and data from an external device via the network connecting device 2207, can load them into the memory 2202, and can use them. The network connecting device 2207 can be used as the output unit 816 of FIG. 8.

The information processing device does not need to include all of the components of FIG. 22, and some components can be omitted according to purposes or conditions. As an example, when the portable recording medium 2209 or a communication network is not used, the medium driving device 2206 or the network connecting device 2207 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an image processing program causing a computer to execute a process comprising:
    extracting a plurality of candidate lines that are observed from a position of an imaging device that captures an image of an object from among a plurality of candidate lines included in shape information of the object;
    generating plural pieces of association information indicating a prescribed number of combinations obtained by respectively associating the prescribed number of candidate lines of the observed plurality of candidate lines with the prescribed number of feature lines of a plurality of feature lines detected from the image;
    generating the prescribed number of projection lines by projecting the prescribed number of candidate lines onto the image; and
    determining an association result according to respective errors of the plural pieces of association information, each of the respective errors indicating a deviation between a position of each of the prescribed number of projection lines and a position of each of the prescribed number of feature lines.

2. The non-transitory computer-readable recording medium according to claim 1, wherein
    the extracting the observed plurality of candidate lines removes one or more hidden lines from the plurality of candidate lines included in the shape information by using a prescribed position in a space as the position of the imaging device, and extracts remaining candidate lines as the observed plurality of candidate lines.

3. The non-transitory computer-readable recording medium according to claim 2, wherein
    the extracting the observed plurality of candidate lines extracts candidate lines indicating an outline edge of the object from among the remaining candidate lines, as the observed plurality of candidate lines.

4. The non-transitory computer-readable recording medium according to claim 3, wherein
    the extracting the observed plurality of candidate lines extracts candidate lines indicating an outer periphery of the object from among the candidate lines indicating the outline edge, as the observed plurality of candidate lines.

5. The non-transitory computer-readable recording medium according to claim 1, wherein
    two candidate lines of the prescribed number of candidate lines are not parallel to each other.

6. The non-transitory computer-readable recording medium according to claim 1, wherein
    no two candidate lines of the prescribed number of candidate lines exist on a straight line.

7. The non-transitory computer-readable recording medium according to claim 1, wherein
    the generating the plural pieces of association information extracts a plurality of feature lines that each include a portion included in a specified region within the image from among the plurality of feature lines detected from the image, and selects the prescribed number of feature lines from the extracted plurality of feature lines.

8. The non-transitory computer-readable recording medium according to claim 1, wherein
    the generating the plural pieces of association information extracts a plurality of feature lines that exist within a range of a prescribed distance from a reference position in the image from among the plurality of feature lines detected from the image, and selects the prescribed number of feature lines from the extracted plurality of feature lines.

9. The non-transitory computer-readable recording medium according to claim 1, wherein
    two feature lines of the prescribed number of feature lines are not parallel to each other.

10. The non-transitory computer-readable recording medium according to claim 1, wherein
    no two feature lines of the prescribed number of feature lines exist on a straight line.

11. An image processing device comprising:
    a memory that stores shape information of an object; and
    a processor coupled to the memory and configured to extract a plurality of candidate lines that are observed from a position of an imaging device that captures an image of the object from among a plurality of candidate lines included in the shape information, to generate plural pieces of association information indicating a prescribed number of combinations obtained by respectively associating the prescribed number of candidate lines of the observed plurality of candidate lines with the prescribed number of feature lines of a plurality of feature lines detected from the image, to generate the prescribed number of projection lines by projecting the prescribed number of candidate lines onto the image, and to determine an association result according to respective errors of the plural pieces of association information, each of the respective errors indicating a deviation between a position of each of the prescribed number of projection lines and a position of each of the prescribed number of feature lines.

12. The image processing device according to claim 11, wherein
    the processor removes one or more hidden lines from the plurality of candidate lines included in the shape information by using a prescribed position in a space as the position of the imaging device, and extracts remaining candidate lines as the observed plurality of candidate lines.

13. An image processing method comprising:

extracting, by a processor, a plurality of candidate lines that are observed from a position of an imaging device that captures an image of an object from among a plurality of candidate lines included in shape information of the object;

generating, by the processor, plural pieces of association information indicating a prescribed number of combinations obtained by respectively associating the prescribed number of candidate lines of the observed plurality of candidate lines with the prescribed number of feature lines of a plurality of feature lines detected from the image;

generating, by the processor, the prescribed number of projection lines by projecting the prescribed number of candidate lines onto the image; and determining, by the processor, an association result according to respective errors of the plural pieces of association information, each of the respective errors indicating a deviation between a position of each of the prescribed number of projection lines and a position of each of the prescribed number of feature lines.

14. The image processing method according to claim 13, wherein the extracting the observed plurality of candidate lines removes one or more hidden lines from the plurality of candidate lines included in the shape information by using a prescribed position in a space as the position of the imaging device, and extracts remaining candidate lines as the observed plurality of candidate lines.

* * * * *